April 5, 1960     A. A. BERNARD     2,931,890
ELECTRODE FEEDING DEVICE FOR ARC WELDING APPARATUS
Filed Jan. 17, 1957
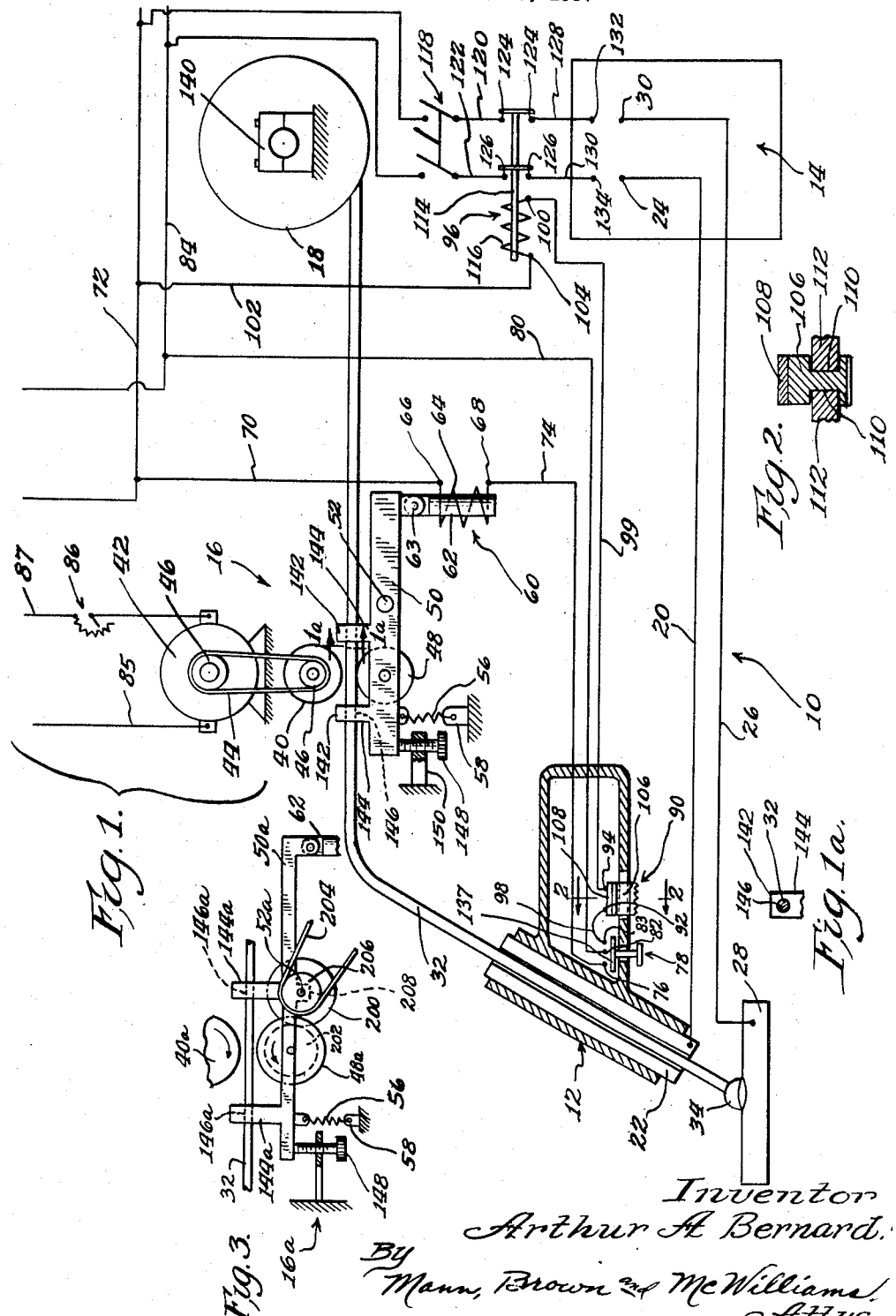
Inventor
Arthur A. Bernard
By Mann, Brown & McWilliams
Attys.

United States Patent Office 2,931,890
Patented Apr. 5, 1960

2,931,890

ELECTRODE FEEDING DEVICE FOR ARC WELDING APPARATUS

Arthur A. Bernard, Chicago Heights, Ill.

Application January 17, 1957, Serial No. 634,748

3 Claims. (Cl. 219—130)

My invention relates to an electrode feeding device for arc welding operations and more specifically to a device for feeding coiled lengths of consumable electrodes to welding torches of high speed automatic welding apparatus.

Though arc welding processes and apparatus have greatly improved in recent years in the performance of the actual welding operation, the improvement in electrode feeding has been very little, if any. For instance, the newer types of gas-shielded arc welding processes consume electrodes at speeds which range from 300 to 1400 inches per minute, as compared with 75 to 200 inches per minute electrode consumption rate in older processes. Yet conventional electrode feeding methods and apparatus, aside from changing gear ratios between the feed rollers and their power source, remain basically the same as they were designed for use in connection with the older and slower welding processes.

In the prior art, though there are a large number of different types of apparatus used for automatic arc welding, all of them operate on the principle of maintaining the arc voltage constant either by varying the speed of the electrode feed to compensate for the minor variations in a preset amperage, or, the reverse of this principle, called the constant voltage type, whereby the electrode is fed to the arc at a preset constant speed and the voltage is maintained by automatically varying the current to compensate for variations in the preset electrode feed.

Conventional electrode feeding apparatus employed in both cases takes the form of powered rollers driven by an electric motor through gearing. Thus, both of these types of apparatus have a common undesirable feature that is attributed to the type of electrode feed apparatus employed, which is that the electrode feed motor must start rotating and stop rotating at the start and finish of each weld applied. The harm in this situation is that, the instant the arc is established, the rate at which the arc heat is capable of melting the electrode is at its peak; however, the rate of electrode feed to the arc is not, because, although the circuit which feeds current to the electrode feeding motor is closed at the same instant the welding current circuit is closed, it takes at least a second for the feed motor to accelerate up to the speed required to satisfy the rate at which the welding current is capable of melting the electrode. Therefore, the length of the welding arc is excessive until that time that the feed motor does reach the speed required to satisfy the melt-off rate. As for example, when the melt-off rate is 1200 inches per minute, this amounts to 20 inches per second and even if it takes only ½ second for the feed motor to accelerate from zero to the required speed, difficulty is experienced in establishing the arc. Obviously, when the melt-off rate is only 45 to 200 inches per minute, as is the case with the older type processes, this lag in acceleration is not as critical as in the case of the new high speed processes.

With the above referred to conventional apparatus, the problem is even more serious in stopping the welding operation, because generally a single switch is used for cutting off current to both the arc and to the electrode feeding motor. Therefore, although the arc is extinguished instantly and current to the feed motor is cut off at that same instant, it takes a second or two for the armature of the feed motor to lose its momentum and come to a complete standstill, with the result that several more inches of electrode are fed though no arc exists. This sulplus electrod material therefore becomes a crumpled up mass which freezes to the weld as the weld metal solidifies. Here again it should be obvious why apparatus adequately efficient for feeding electrodes to the older type processes at speeds of 75 to 200 inches per minute is not satisfactory for the modern high speed gas-shielded arc welding processes.

Others have tried to solve this problem in different ways. One of the methods suggested was to use a spring operated brake on an extended shaft of the feed motor armature, the brake being held open during the welding operation by using the force of a solenoid to arrest the force of the spring during the welding operation, with the brake becoming active the instant the solenoid became de-energized when the welding current circuit was opened. Another method was to use a special motor containing a special winding which acted as an electric brake when the special winding became energized at the instant the current to the conventional motor winding was cut off. Both of these methods, however, operated on the principle of stopping the rotation of the armature in a shorter period of time, and even though one or both of these methods were 90 percent efficient in correcting the over-run condition, at the higher rates of electrode speed, as for example, at 1200 inches per minute (which amounts to 20 inches per second) at least one or more inches of electrode would be fed to the welding zone after the arc was extinguished. But even more important, neither of these two methods make any provision for correcting the lag which exists during the short interval of time it takes for the feed motor to build up to the preset or predetermined speed required to satisfy the melt-off rate of the preset welding current.

Another undesirable feature common with conventional apparatus is the difficulty experienced in inching the electrode into proper position prior to actually starting the welding operation. Generally speaking, it is common practice to establish welding positioning between the electrode and the work-piece by spacing the tip of the electrode from the workpiece just enough so that the two are not in contact. This practice is followed to better insure that the arc will be established when the flow of welding current starts. With conventional apparatus, each time the inching switch is operated to inch the tip of the electrode toward the work-piece just a little at a time, the electrode feed motor must start to rotate and then coast to a stop. Consequently, it takes skill and experience to carry out this precise operation when the tip of the electrode must be moved just a fraction of an inch toward the work-piece.

One of the principal objects of my invention is to provide an apparatus for feeding electrodes in which the electrode starts to feed to the arc at the very instant that the arc is established and at the full speed required to satisfy the melt-off rate of the electrode.

Another and equally important principal object is to provide an electrode feeding apparatus in which the feeding of the electrode ceases completely and instantaneously at the instant that welding current ceases to flow.

A further important object of the invention is to provide an arc welding apparatus in which much higher rates of welding speed are available due to the fact that the above described lag in electrode feed at the beginning of the welding operation and the above described overrunning of the electrode at the end of welding operation are eliminated.

Other objects, uses, and advantages will become apparent or be obvious from a study of the following detailed description and the application drawing.

In the drawing:

Figure 1 is a diagrammatic plan view illustrating my invention as applied to an arc welding machine;

Figure 1a is a diagrammatic fragmental view along line 1a—1a of Figure 1;

Figure 2 is a detailed diagrammatic cross-sectional view along line 2—2 of Figure 1; and Figure 3 is a fragmental view similar to that of Figure 1 illustrating a modified form of my invention.

Reference numeral 10 of Figure 1 generally designates a preferred embodiment of the invention, which is only diagrammatically illustrated. The apparatus 10 includes a welding torch 12 of conventional design except as hereinafter described, a welding machine 14 which is only diagrammatically illustrated as it may be of any conventional type and may be of either the transformer type or a motor-generator type, for furnishing the welding current to the torch 12. An electrode feeding mechanism 16 feeds the electrode to the torch 12 from a conventional electrode reel 18 upon which it is wound in the usual manner.

In the embodiment of the invention illustrated in Figure 1, the welding current circuit for torch 12 is formed by an electrical conduit 20 extending between the torch brush 22 and an outlet terminal 24 of machine 14 and an electrical conduit 26 extending between the work-piece 28 and a second outlet terminal 30 of said welding machine 14. As is well known in the art, as the electrode 32 passes through the torch 12, it is placed in sliding contact with the brush 22 which completes the electrical circuit between the torch and the welding machine 14. The electrical current establishes arc 34 between the electrode and the work-piece 28 in accordance with the usual arc welding procedure.

The electrode feeding apparatus 16 generally comprises in the embodiment of Figure 1 a continuously driven feed roller 40 driven at the desired speed by, for instance, electric motor 42 through a belt or chain 44 that is trained over pulleys 46 keyed respectively to the motor and the feed roller. Alternatively, appropriate gearing between the motor 42 and the roller 40 may be employed. Opposing the feed roller 40 is an idler feed roller 48 rotatably mounted on a rocker arm or lever 50 pivoted as at 52 in any suitable manner. The rocker arm or lever 50 is biased in a counterclockwise direction about pivotal mounting 52 by a tension spring 56 connected between the rocker arm and a stationary bracket 58. The other end of the rocker arm is secured to a pull type solenoid 60 including a core element 62 mounted inside a stationary coil 64. The core element 62 is pivotally secured to arm 50 as at 63. An electrical conduit 70 extends between power line 72 and terminal 66 of coil 64, while electrical conduit 74 extends between the terminal 68 of the coil and the terminal 76 of conventional switch 78 forming a part of welding torch 12. Electrical conduit 80 connects terminal 82 of switch 78 to power line 84.

Preferably, the electrical motor 42 operates continuously during the welding operation, it being supplied with current through conduits 85 and 87, and its speed may be varied electrically by varying the current with an appropriate rheostat 86 which is only diagrammatically illustrated as it may be of any conventional type.

The torch 12 also includes separate slide type switch 90 which in the embodiment of Figure 1 normally completes a circuit between two contacts 92 and 94 that are electrically connected to the power lines 72 and 84 and a relay operated switch 96, which is only diagrammatically illustrated, that controls the operation of welding machine 14. A short electrical conduit 98 extends between terminal 83 of switch 78 and terminal 92 of switch 90. An electrical conduit 99 extends between terminal 94 of switch 90 and coil terminal 100 of switch 96, an electrical conduit 102 extending between the other coil terminal 104 of switch 96 and the power line 72. The switch 90 includes a thumb or finger operated sliding element 106 formed of insulating material and including a contact plate 108 made of material having good electrical conductance properties, such as copper. The element 106 may be slidably mounted by forming grooves 110 therein which cooperate with flanges 112 forming a part of the welding torch 12, or in any other suitable manner.

The switch 96 includes a core element 114 that cooperates with a coil 116 extending between terminals 100 and 104. Double pole switch 118 is normally closed, connecting electrical conduits 120 and 122 to the power lines 72 and 84. When switch 90 is positioned as shown in Figure 1 and switch 78 is closed, the coil 116 of switch 96 is energized to close contacts 124 and 126 of switch 96 which complete the electrical circuit to the machine 14 through conduits 128 and 130. Of course, appropriate electrical circuiting extends between terminals 132 and 134 of conduits 128 and 130 and the terminals 24 and 30.

Reel 18 is rotatably mounted in appropriate bearings 140 of any suitable design. The electrode 32 leads from reel 18 through a pair of guides 142 positioned on either side of the rollers 40 and 48 and integral with rocker arm or lever 50 and thence to the welding torch 12. The guides 142 are spaced on either side of the feed rollers 40 and 48 and comprise lugs 144 in which openings 146 have been formed to receive the electrode 32. An adjusting screw 148 screw threadedly mounted in an appropriate fixed support 150 may be provided for adjusting the rocker arm 50 as hereinafter described.

When switch 90 is positioned as shown and switch 78 is operated to close contacts 76, 82 and 83 thereof, switch 96 is closed which sets the welding machine 14 in operation to provide welding current for maintaining the arc 34. Welding current flows through the electrical conduits 20 and 26, the brush 22, the electrode 32, the arc 34, and the work-piece 28. The welding current may be direct of either polarity, or alternating, which would establish the exact current flow through the apparatus 10, which is immaterial for purposes of this disclosure. The rocker arm 50 is also actuated by the closing of switch 78 since coil 64 of solenoid 60 is energized to pull core element 62 downwardly and pivot arm or lever 50 in a clockwise direction about pivotal mounting 52. This downward pull applied to the right hand end of arm or lever 50 is designed to overcome the tensile force of spring 56 and move the left hand end of the arm or lever 50 upwardly toward the continuously rotating feed roller 40. The idler roller 48 bears against the electrode 32, which in turn is pressed against the continuously rotating feed roller 40 by the action of the solenoid 60. This instantaneously establishes traction between the feed roller 40 and the electrode and the electrode commences to feed into the torch 12. Of course, appropriate guiding devices are interposed between the feeding mechanism 16 and the torch 12 if required in accordance with the particular installation or operational requirements.

It will be appreciated that the supplying of welding torch 12 with current and the commencing of the electrode feeding operation is simultaneous and instantaneous. Both start at the same time, and since feed roller 40 preferably rotates continuously at the same speed (motor 42 being appropriately adjusted or preset to provide the desired speed), the speed of electrode feed is at the desired electrode feed rate for the particular welding operation at the instant that welding current flows through the torch.

When switch 78 is operated to break electrical contact between the terminals 76, 82 and 83, the coils 64 and 116 are immediately and simultaneously de-energized.

This shuts off welding machine 14 and releases core element 62 of solenoid 60 with the result that rocker arm or lever 50 pivots counterclockwise under the action of spring 56 to draw the idler roller 48 away from the driven roller 40. In the illustrated embodiment, the electrode is also drawn away from the roller 40. Parenthetically, it may be added that appropriate resilient means is conventionally employed in switch 78 to bias its circuit completing element 137 away from contacts 76, 82 and 83 so that the operator just releases switch 78 to shut off the welding current and stop the feeding operation.

It will be appreciated, therefore, that the starting and stopping of electrode feed as well as the starting and stopping electrode welding current flow is simultaneous and instantaneous. This eliminates the above described feed lag and over-run at the beginning and end of welding operations.

As there need be only a few thousandths of an inch of separation between the feed roller 40 and electrode 32 during periods of inoperation, adjusting screw 148 may be actuated to provide this space. The narrow spacing between the electrode 32 and roller 40 reduces the distance the electrode must travel to start feeding, which contributes to the elimination of feed lag.

The switch 90 is operated to break the electrical circuit between terminals 92 and 94 only at the very start of a particular welding operation when it is desired to properly position the tip of the welding electrode with respect to the work-piece. This is done by sliding element 106 to the right of Figure 1 (and of course element 106 is returned to its illustrated position before welding commences). This permits the feeding mechanism 16 to be operated, but as switch 96 will not be energized, no welding current is supplied to the welding torch 12. Thus, the feed mechanism not only may be actuated to properly position the tip of electrode 32 with respect to the work-piece 28 without experiencing the adverse effects caused by the above described electrode feed lag and over-run, but also there is no danger of welding starting prematurely as no welding current is supplied to the torch during this inching procedure. Formerly, operators had to inch the tip of the electrode toward the work-piece a little at a time, by starting the motor for a short period of time and then permitting it to coast to a stop. Heretofore, it has taken a considerable amount of skill and experience to carry out this operation, but with my invention, no extraordinary skill and experience is required since electrode feed lag and over-run are eliminated. Thus, the electrode is momentarily brought into contact with the rotating driving roller 40 and the instant the traction breaks between the electrode and the driving roller (by de-energizing coil 64 of solenoid 60) its movement stops and there is no coasting. The electrode is brought momentarily into frictional engagement with roller 40 as often as required to provide the proper spacing.

Figure 3 illustrates a modification 16a of the feeding mechanism 16 which may be substituted for the device 16 wherein the roller 48a is driven and the feed guides of the rocker arm 50a are arranged to space the electrode from both of the rollers during periods of inaction. Rocker arm 50a includes a driven gear 200 that meshes with a gear 202 keyed or fixed with respect to the roller 48a. Gear 200 may be driven by a belt or chain 204 engaging a pulley or sprocket 206 that is keyed or fixed with respect to the gear 200. The gear 200 and pulley or sprocket 206 may be rotatably secured to a depending arm 208 integral or fixed to rocker arm 50a, and preferably its axis of rotation coincides with the axis of pivotal mounting 52a about which rocker arm 50a pivots.

The lugs 144a of the rocker arm are generally similar to lugs 144 of Figure 1 except that the openings 146a are positioned above the periphery of roller 48a sufficiently so that electrode 32 will be spaced somewhat from roller 48a when disengaged from roller 40a on inaction of the apparatus (note the difference between Figures 1 and 3). The feeding mechanism 16a includes the adjusting screw 148, solenoid core element 62 of the embodiment of Figure 1, and tension spring 56.

The upper feed roller 40a is arranged and driven in a manner similar to the way roller 40 is arranged and driven in the embodiment of Figure 1, and feed roller 48a may be driven from the same motor 42.

In operation, the rollers 40a and 48a are driven in the directions indicated by the arrows of Figure 3. During off-welding periods the spring 56 maintains the non-driving spacing between rollers 40a and 48a. When the welding torch is actuated to provide welding current, the solenoid 60 pivots rocker arm 50a about its pivotal mounting 52a to press the electrode 32 against the driving roller 40a and also press the driving roller 48a against the electrode. When the welding torch switches are operated to cut off welding current flow, spring 56 pivots rocker arm 50a to draw roller 48a away from roller 40a. The inherent stiffness of the electrode 32 and the spacing of openings 146a spaces the electrode above the roller 48a so that traction between both rollers and the electrode is broken. The engagement of the two rollers with the electrode and their disengagement therefrom is instantaneous and occurs simultaneously with the stopping and starting of the welding current flow. Thus, the same benefits are provided by this form of the invention as that discussed above.

It may be added that although only one power driven feed roller and one idler roller are shown in Figure 1, in actual practice a plurality of driving feed rollers with opposing feed rolls are used. This is to increase the frictional contact between the feeding rollers and the electrode. Also, the feed rollers are preferably provided with peripheral V-shaped grooves (not shown) to further increase the friction between the feed rolls and the surface of the electrode.

It will therefore be seen that my invention completely eliminates the undesirable electrode lag and overfeed at the beginning and end of a welding period. This is done by operating the drive rollers continuously during off periods of welding as well as during welding, and providing apparatus for bringing the electrode into contact with the driving feed rolls the instant that the welding current circuit is closed to establish the arc. With this arrangement, there can be no lag during the instant that the driving feed rolls start to feed the electrode because the driving feed rolls always rotate at the required rate of speed. Equally important, there can be no over-run of electrode when the welding arc is extinguished because the feeding of the electrode stops instantly by removing the electrode from engagement with the driving rolls, leaving the driving feed rolls rotating. Thus, the movement of the electrode to the arc stops completely the very instant the arc is extinguished.

Moreover, the continuously operated feed rolls and the separate welding torch switch for breaking the welding current circuit permit the feeding mechanism to be employed for inching the electrode into position, without being concerned about prematurely establishing a welding arc. The electrode may be brought into momentary contact with the driving feed rollers to move it the required distance, and upon breaking of the traction between the electrode and the feed rollers, movement of the electrode ceases completely and there is no coasting.

The foregoing description and the drawings are given merely to explain and illustrate my invention and the manner in which it may be performed, and the invention is not to be limited thereto, except in so far as the appended claims are so limited, since those skilled in the art who have my disclosure before them will be able to make modifications and variations therein without departing from the scope of the invention.

I claim:

1. In an arc welding machine including a welding torch and a length of electrode that is to be fed to and through the torch to the arc, a feeding device therefor comprising a roller positioned on each side of the length of electrode and rearwardly of the torch, means for continuously driving one of said rollers, one of said rollers being mounted on lever means, resilient means continuously acting on said lever means to draw the roller mounted thereon away from engagement with the electrode, guide means mounted on said lever means for guiding the movement of the electrode, and solenoid means acting on said lever means to force the roller mounted thereon toward said other roller to press the electrode into frictional engagement with both of said rollers, said solenoid means and the torch being electrically interconnected, and common switch means for simultaneously actuating the welding torch and said solenoid means and for simultaneously inactuating same, whereby the length of electrode is fed toward the torch only when the torch is actuated.

2. The feeding device set forth in claim 1 wherein said roller which is mounted on the lever means is an idler roller.

3. The feeding device set forth in claim 1 wherein means is provided for continuously driving said roller which is mounted on the lever means.

References Cited in the file of this patent

UNITED STATES PATENTS

| | | |
|---|---|---|
| 1,392,436 | Morton | Oct. 4, 1921 |
| 1,701,372 | Jefts | Feb. 5, 1929 |
| 1,731,502 | Paterson | Oct. 15, 1929 |
| 2,721,249 | Landis et al. | Oct. 18, 1955 |
| 2,809,280 | Van Der Willigen et al. | Oct. 8, 1957 |